United States Patent
Kimura et al.

(10) Patent No.: US 7,946,957 B2
(45) Date of Patent: May 24, 2011

(54) SHIFT RANGE CHANGE SYSTEM

(75) Inventors: Kiyoshi Kimura, Obu (JP); Shigeru Kamio, Nagoya (JP)

(73) Assignee: Denso Corporation, Kariya (JP)

( * ) Notice: Subject to any disclaimer, the term of this patent is extended or adjusted under 35 U.S.C. 154(b) by 435 days.

(21) Appl. No.: 12/262,480

(22) Filed: Oct. 31, 2008

(65) Prior Publication Data

US 2009/0120222 A1    May 14, 2009

(30) Foreign Application Priority Data

Nov. 13, 2007   (JP) .................................. 2007-294422

(51) Int. Cl.
*B60W 10/10*     (2006.01)
(52) U.S. Cl. ...................................................... 477/111
(58) Field of Classification Search .................... 477/20, 477/111
See application file for complete search history.

(56) References Cited

U.S. PATENT DOCUMENTS

| | | | |
|---|---|---|---|
| 2004/0200301 A1* | 10/2004 | Amamiya et al. | 74/335 |
| 2006/0138880 A1 | 6/2006 | Kimura et al. | |
| 2006/0207373 A1 | 9/2006 | Amamiya et al. | |
| 2007/0144287 A1 | 6/2007 | Kimura et al. | |
| 2008/0168853 A1 | 7/2008 | Amamiya et al. | |
| 2008/0210033 A1 | 9/2008 | Amamiya et al. | |

FOREIGN PATENT DOCUMENTS

| | | |
|---|---|---|
| JP | 10-011366 | 1/1998 |
| JP | 2001-271917 | 10/2001 |

OTHER PUBLICATIONS

Japanese Office Action dated Sep. 15, 2009, issued in corresponding Japanese Application No. 2007-294422, with English translation.

* cited by examiner

*Primary Examiner* — Edwin A Young
(74) *Attorney, Agent, or Firm* — Nixon & Vanderhye PC (57) ABSTRACT

A motor needs to provide a first torque at the time of releasing a shift range from a parking range and needs to provide a second torque smaller than the first torque at the time of placing the shift range into the parking range. Also, the motor needs to provide a third torque smaller than the second torque at the time of changing the shift range from one non-parking range to another non-parking range and needs to provide a fourth torque smaller than the third torque at the time of executing the parking range wall abutment learning. When the parking range wall abutment learning is executed from the parking range, a motor control apparatus controls the torque to the third or fourth torque. When the parking range wall abutment learning is executed from any non-parking range, the motor control apparatus controls the torque to the first or second torque.

4 Claims, 4 Drawing Sheets

SHIFT RANGE CHANGE SYSTEM

CROSS REFERENCE TO RELATED APPLICATION

This application is based on and incorporates herein by reference Japanese Patent Application No. 2007-294422 filed on Nov. 13, 2007.

BACKGROUND OF THE INVENTION

1. Field of the Invention

The present invention relates to a shift range change system of an automatic transmission of a vehicle.

2. Description of Related Art

For example, one previously proposed automatic transmission of a vehicle includes a shift range change mechanism and a parking change mechanism and is shifted manually by a driver of the vehicle. However, lately, a shift range change system (a shift-by-wire abbreviated as "SBW"), which changes the shift range change mechanism and the parking change mechanism through a rotary actuator having an electric motor, is prevailing in the market.

In general, the vehicle is designed on the assumption that the vehicle is used in various conditions, so that the vehicle is designed to be parked on, for example, a slope (a sloping road).

At the time of parking the vehicle on the slope, the gravitational force, which acts on the vehicle to move the vehicle, is applied through an axle of the vehicle to an engaged part of the parking change mechanism (an engaged part between a parking gear and a park pole) and also between the park pole and a park rod in the parking change mechanism. This force is increased proportional to the tilt angle of the vehicle on the slope. In view of this, the rotary actuator (the SBW actuator) is set to generate a large output torque to smoothly release the engagement of the parking change mechanism at the time of parking release (time of changing from the parking range to the corresponding non-parking range) for releasing the engagement of the parking change mechanism even in the parked state of the vehicle on the slope.

As described above, the rotary actuator is set to generate the large torque, which is required at the time of the parking release on the slope.

Here, a technique of "parking range wall (P-wall) abutment learning" is known. In this P-wall abutment learning, when an ignition (IG) switch is turned on, the electric power is supplied to the motor to abut a movable member of the shift range change mechanism against a parking range side movable limit position thereof to sense a reference position of the rotor of the motor.

However, when the P-wall abutment learning is executed with the maximum torque of the motor (the large torque A, which is required at the time of executing parking release of the vehicle on the slope), a relatively large mechanical load is generated at the time of abutment of the movable member against the stationary member (the rotary actuator and the automatic transmission), so that the mechanical damage may possibly occur in the movable member and/or the stationary member.

For example, JP2004-308752A (corresponding to US2006/0207373), JP2001-271917A, JP2006-191709A (corresponding to US2006/0138880) and JP2007-170545A (corresponding to US2007/0144287) disclose a technique of reducing the output torque of the motor with use of duty ratio control at the time of executing the P-wall abutment learning.

Lately, many shift range change systems have "auto-P function", which sets the shift range of the automatic transmission to a parking range (P-range) and then turns off the electric power source of the motor control apparatus (SBW ECU). Therefore, at the time of turning on of the IG switch, the shift range of the automatic transmission is the P-range.

However, sometimes, the IG switch is turned on from the other shift range (hereinafter, referred to as a non-parking range), which is other than the P-range. In order to facilitate understanding of this situation, a specific example will be described. At the time of assembling the vehicle at the factory, the range is set to a neutral range (N-range) to enable the transferring of the vehicle from one assembling location to another assembling location. The IG switch may be turned on from that state (i.e., in the N-range). In such a case, the electric power source of the motor control apparatus may be intentionally turned off at the N-range to enable the towing of the vehicle. Thereafter, the IG switch may be turned on from that state. Alternatively, the electric power source of the SBW ECU may be turned off at the non-parking range due to malfunctioning. Thereafter, the IG switch may be turned on from that state (i.e., in the non-parking range).

Here, the P-wall abutment learning is executed as follows. That is, the motor is rotated toward a parking range side, and the movable member of the shift range change mechanism is abutted against the parking range side movable limit position (e.g., is abutted against a wall referred to as the P-wall). The output torque at the time of executing the P-wall abutment learning is determined in view of the case where the IG switch is turned on from the non-parking range (the case occurring at the very low frequency).

That is, at the time of executing the P-wall abutment learning, the duty ratio control is executed to reduce the output of the motor 5. However, according to the previously proposed technique, the duty ratio is set such that an output torque B, which is required to change from the non-parking range to the parking range (parking setting), is generated from the motor.

The above technique may be summarized as follows. That is, at the time of executing the P-wall abutment learning, the duty ratio control is executed such that the torque of the motor is set to the output torque B, which is required for the parking setting. At the time of executing the other control (the other control, which is other than the P-wall abutment), the torque of the motor is set to the relatively large torque A, which is required at the time of parking release on the slope.

The output torque C of the motor, which is required to change from one of the non-parking ranges to another one of the non-parking ranges at the situation other than the parking release and the parking setting, is smaller than the output torques A, B described above.

Furthermore, the output torque D of the motor, which is required to implement the P-wall abutment learning from the P-range, is smaller than the output torque C.

That is, the output torques, which are required at the motor 5, are set according to the type of the change process to achieve the relationship of the output torque A>the output torque B>the output torque C>the output torque D.

As discussed above, the output torque, which is required at the motor at the time of executing the P-wall abutment learning from the P-range, is the output torque D. However, upon consideration of the P-wall abutment learning from the non-parking range, which occurs at the very low frequency, the output torque of the motor at the time of executing the P-wall abutment learning is set to the output torque B through the duty ratio control in the previously proposed technique.

Therefore, in the case of executing the P-wall abutment learning from the parking range, which occurs at the relatively high frequency, the motor may possibly generate an excessively large torque to apply a relatively large mechanical damage to the movable member and the stationary member (e.g., the rotary actuator and the automatic transmission) to reduce the durability thereof.

SUMMARY OF THE INVENTION

The present invention is made in view of the above points. According to one aspect of the present invention, there is provided a shift range change system for a vehicle, including a shift range change mechanism, a parking changing mechanism, an electric rotary actuator and a motor control apparatus. The shift range change mechanism changes a shift range of an automatic transmission of the vehicle among a plurality of ranges, which includes a parking range and a plurality of non-parking ranges. The parking change mechanism limits rotation of a drive axle of the vehicle upon placing of the shift range into the parking range and enables the rotation of the drive axle upon releasing of the shift range from the parking range. The electric rotary actuator includes an electric motor and drives the shift range change mechanism and the parking change mechanism. The motor control apparatus adjusts an output torque of the electric motor through duty ratio control and includes a normal control means and a parking range wall abutment executing means. The normal control means is for controlling the change of the shift range by controlling the electric power supplied to the electric motor. The parking range wall abutment executing means is for executing parking range wall abutment learning to sense a reference position of a rotor of the electric motor by rotating the electric motor in a predetermined direction upon satisfaction of a predetermined operational condition and thereby driving a movable member of the shift range change mechanism toward a parking range side movable limit position until the movable member abuts against the parking range side movable limit position. The electric motor is required to provide at least a first output torque at the time of releasing the shift range from the parking range. The electric motor is required to provide at least a second output torque, which is smaller than the first output torque, at the time of placing the shift range into the parking range. The electric motor is required to provide at least a third output torque, which is smaller than the second output torque, at time of changing the shift range from one of the plurality of non-parking ranges to another one of the plurality of non-parking ranges. The electric motor is required to provide at least a fourth output torque, which is smaller than the third output torque, at time of executing the parking range wall abutment learning. When the parking range wall abutment learning is executed from the parking range, the motor control apparatus controls the output torque of the electric motor to the third output torque or the fourth output torque. Furthermore, when the parking range wall abutment learning is executed from any one of the plurality of non-parking ranges, the motor control apparatus controls the output torque of the electric motor to the first output torque or the second output torque.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A shift range change system according to a first embodiment of the present invention will be described with reference to FIGS. 1 to 5.

Figure 2:
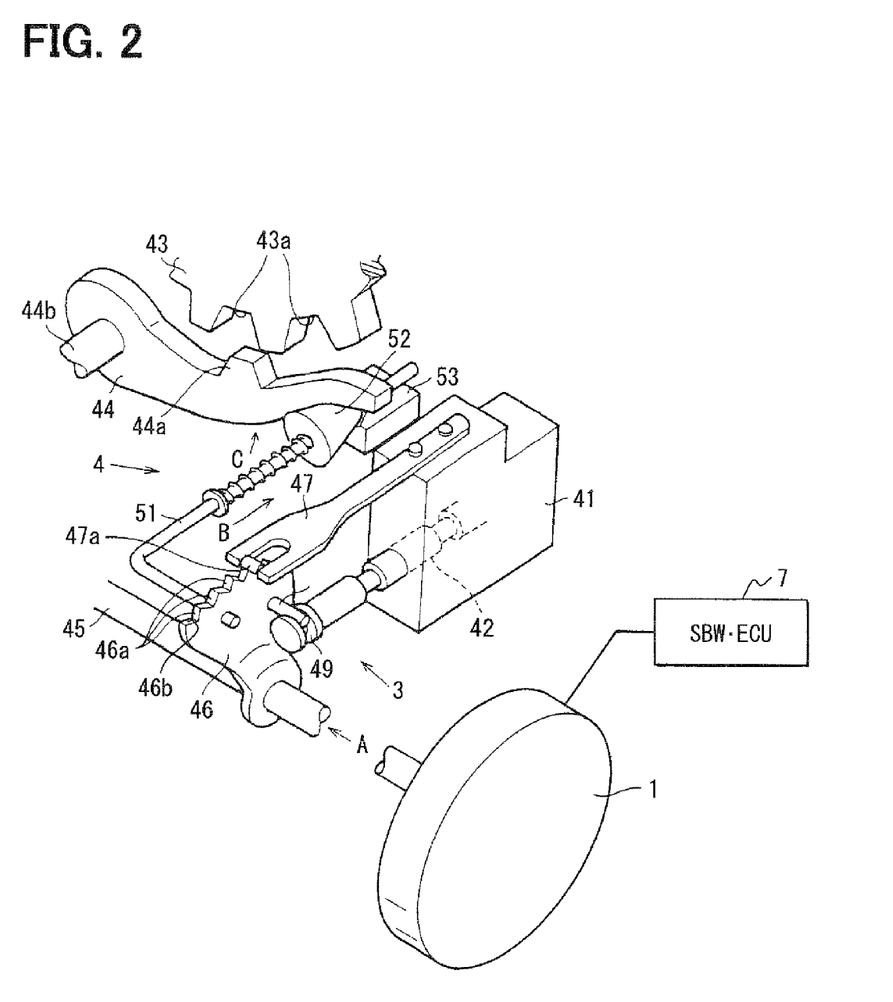
FIG. 2 is a schematic diagram showing a shift range change system having a parking change mechanism and a shift range change mechanism according to the embodiment.

As shown in FIG. 2, in the shift range change system, a rotary actuator 1 is used to change, i.e., shift a shift range change mechanism 3 and a parking change mechanism 4 installed in an automatic transmission 2 of a vehicle.

Figure 3:
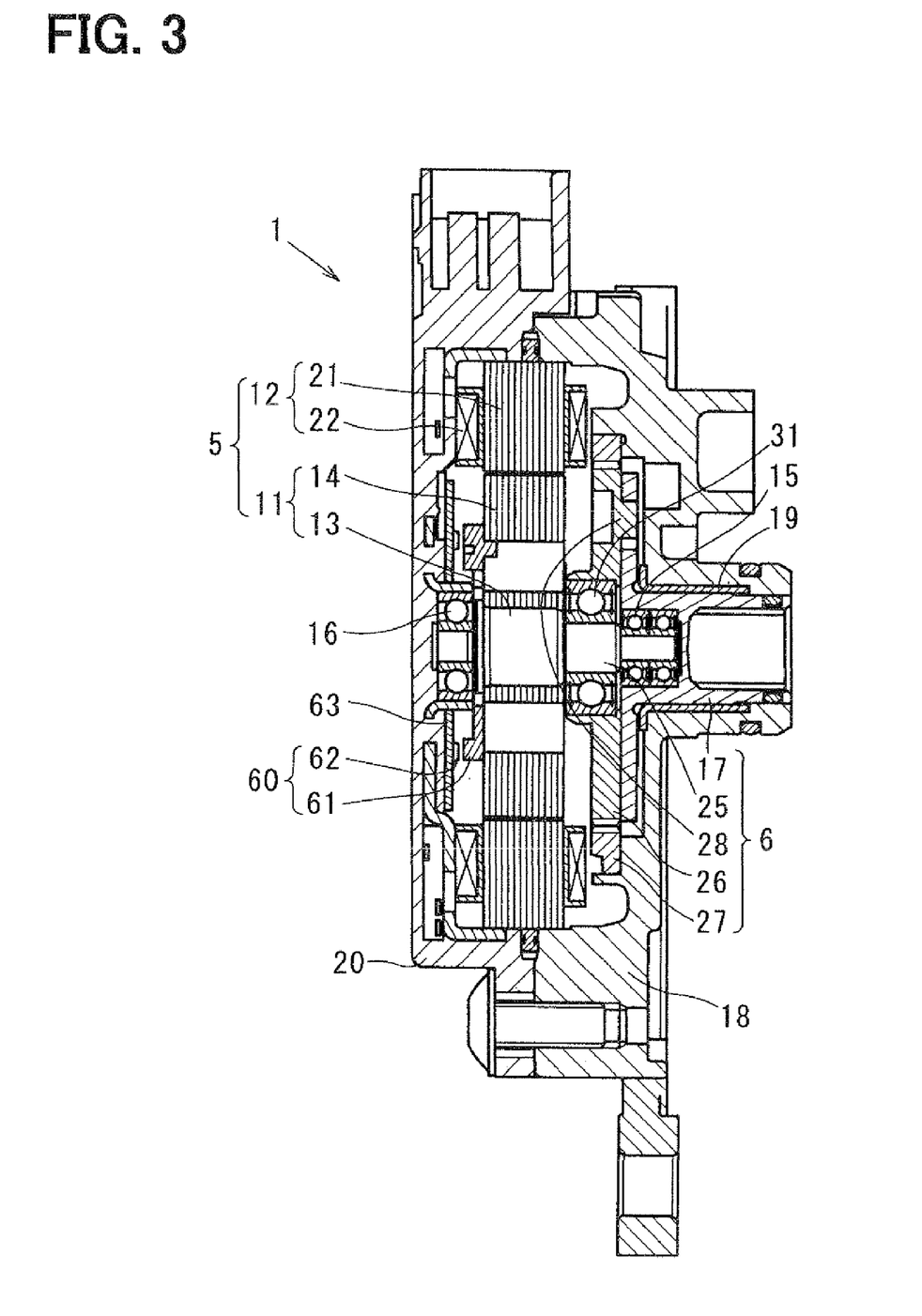
FIG. 3 is a cross sectional view of a rotary actuator according to the embodiment.
Figure 4:
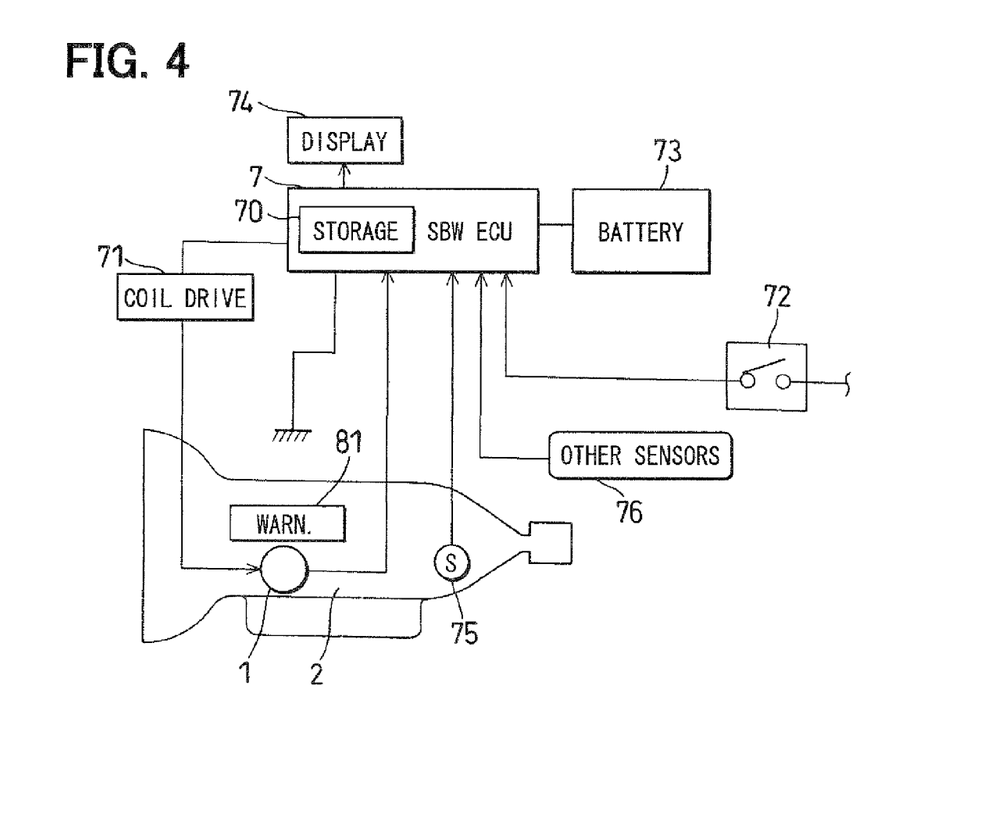
FIG. 4 is a schematic diagram showing a structure of the shift range change system according to the embodiment.

The rotary actuator 1 is a servo mechanism, which drives the shift range change mechanism 3. As shown in FIG. 3, the rotary actuator 1 includes a synchronous electric motor 5 and a speed reducer 6. The speed reducer 6 reduces a speed (rotational speed) of rotation of the motor 5 and outputs the rotation of the reduced speed. As shown in FIG. 4, the rotation of the motor 5 is controlled by a shift-by-wire electronic control unit (SBW ECU) 7, which serves as a motor control apparatus.

Specifically, the shift range change system controls the shift range change mechanism 3 and the parking change mechanism 4, which are driven through the speed reducer 6, by controlling a rotational direction, the number of rotations and a rotational angle of the motor 5 through the SBW ECU 7.

Next, the structure of the shift range change system will be described in detail. In the following description, a right side and a left side of FIG. 3 correspond to a front side and a rear side, respectively, of the rotary actuator 1. However, it should be noted that these terms, i.e., the front side and the rear side are merely used for the descriptive purpose and are not related to an actual installation direction of the rotary actuator 1.

The motor 5 of the first embodiment is a brushless switched reluctance (SR) motor, which does not use a permanent magnet. The motor 5 includes a rotor 11 and a stator 12. The rotor 11 is rotatably supported, and the stator 12 is coaxial with the rotor 11.

The rotor 11 includes a rotor shaft 13 and a rotor core 14. The rotor shaft 13 is rotatably supported by two bearings (i.e., a front rolling bearing 15 and a rear rolling bearing 16), which are provided at a front end and a rear end, respectively, of the rotor shaft 13.

The front rolling bearing 15 is securely fitted to an inner peripheral surface of an output shaft 17 of the speed reducer 6. The output shaft 17 of the speed reducer 6 is rotatably supported by a metal bearing 19, which is held by an inner peripheral surface of a front housing 18. Specifically, the front end of the rotor shaft 13 is rotatably supported by the front rolling bearing 15 that is supported by the output shaft 17, which is in turn supported by the metal bearing 19 provided in the front housing 18.

An axial support range of the metal bearing 19 is set to overlap with an axial support range of the front rolling bearing 15. In this way, it is possible to limit tilting of the rotor shaft 13, which is caused by a reaction force of the speed reducer 6 (specifically, a reaction force of a load caused by engagement between a sun gear 26 and a ring gear 27 described below).

The rear rolling bearing 16 is press fitted to an outer peripheral surface of the rotor shaft 13 and is supported by a rear housing 20 (a stator housing).

The stator 12 includes a stator core 21 and excitation coils 22 of multiple phases, which are fixed in the housing (the front housing 18 and the rear housing 20). The excitation coils 22 generate a magnetic force upon energization thereof.

The stator core 21 is formed by stacking a plurality of thin plates and is fixed to the rear housing 20. More specifically, the stator core 21 includes a plurality of stator teeth (inwardly projecting salient poles), which radially inwardly project toward the rotor core 14 and are arranged one after another at predetermined angular intervals (e.g., at 30 degree intervals). Each of the stator teeth is provided with the corresponding excitation coil 22 for generating the magnetic force at each of the stator teeth. Energization of each excitation coil 22 is controlled by the SBW ECU 7.

The rotor core 14 is formed by stacking a plurality of thin plates and is securely press fitted to the rotor shaft 13. The rotor core 14 includes a plurality of rotor teeth (outwardly projecting salient poles), which radially outwardly project toward the stator core 21 and are arranged one after another at predetermined angular intervals (e.g., 45 degree intervals).

The SBW ECU 7 sequentially changes the energization position and the energization direction of the respective excitation coils 22 to sequentially change the active stator teeth, which magnetically attract the rotor teeth, so that the rotor 11 is rotated in one direction or the other direction.

Figure 5:
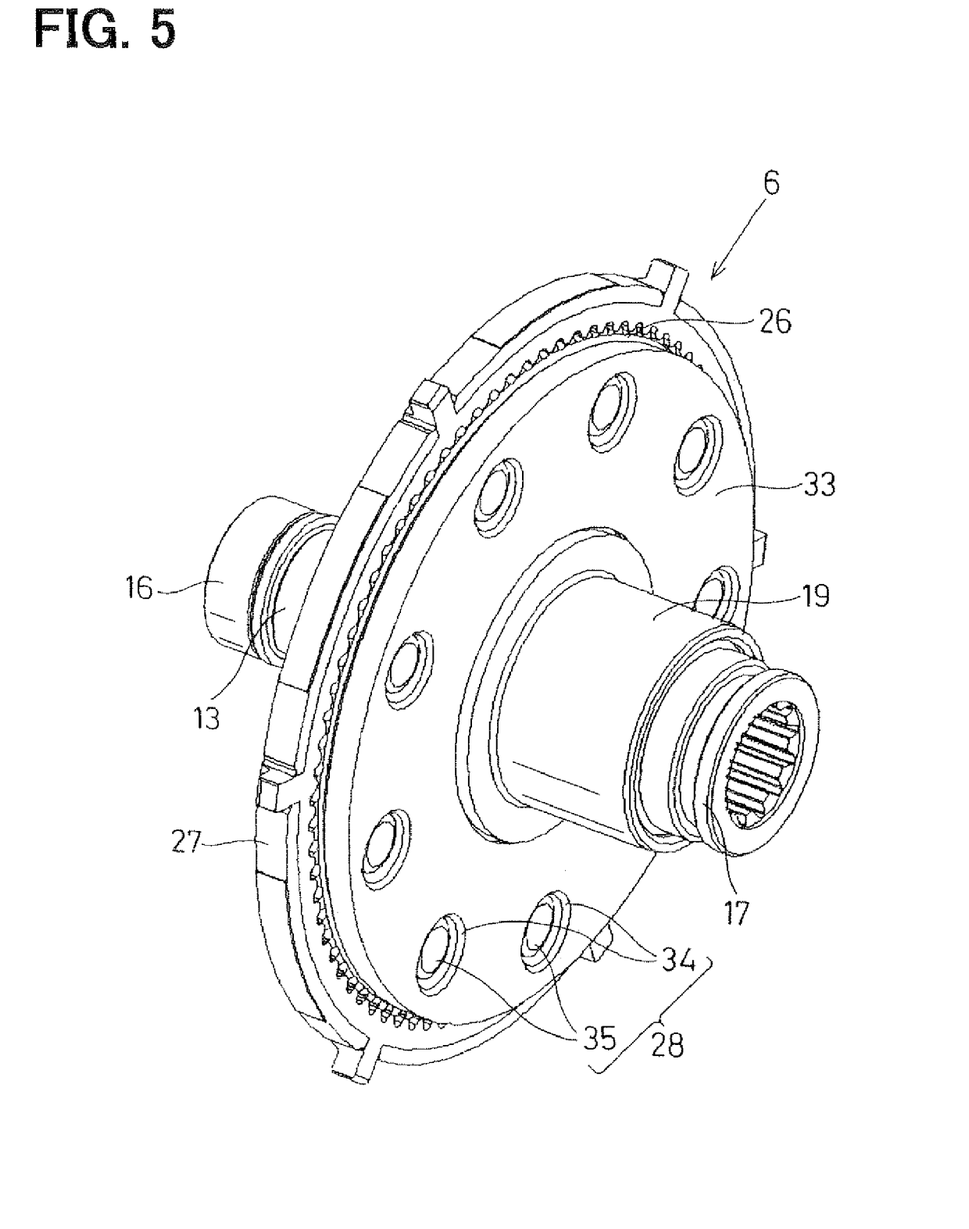
FIG. 5 is a perspective view of a speed reducer taken from a front side thereof according to the embodiment.

The speed reducer 6 will be described with reference to FIGS. 3 and 5.

The speed reducer 6 of the first embodiment is an inner gearing planetary gear speed reducer (a cycloid speed reducer), which is one of various types of planetary speed reducers. The speed reducer 6 includes the sun gear 26 (inner gear: externally toothed gear), the ring gear 27 (outer gear: internally toothed gear) and a transmitting device (a transmitting means) 28. The sun gear 26 is eccentrically rotatably installed to the rotor shaft 13 through an eccentric portion 25, which is provided to the rotor shaft 13. The ring gear 27 is meshed with the sun gar 26, which is located radially inward of the ring gear 27. The transmitting device 28 transmits only a rotational force component of the sun gear 26 to the output shaft 17.

The eccentric portion 25 is a shaft, which is eccentrically rotated about a rotational center of the rotor shaft 13 to cause swing rotation of the sun gear 26. The eccentric portion 25 rotatably supports the sun gear 26 through a sun gear bearing 31, which is positioned radially outward of the eccentric portion 25.

As described above, the sun gear 26 is rotatably supported by the eccentric portion 25 of the rotor shaft 13 through the sun gear bearing 31. When the eccentric portion 25 is rotated, the sun gear 26 is rotated while being urged against the ring gear 27.

The ring gear 27 is fixed to the front housing 18.

The transmitting device 28 includes a plurality of inner pin holes 34 and a plurality of inner pins 35. The inner pin holes 34 are arranged one after another along a common imaginary circle on a flange 33, which rotates integrally with the output shaft 17. The inner pins 35 are formed in the sun gear 26 and are loosely fitted into the inner pin holes 34, respectively.

The inner pins 35 project from a front surface of the sun gear 26.

The inner pin holes 34 are formed in the flange 33, which is provided at the rear end of the output shaft 17. The rotation of the sun gear 26 is transmitted to the output shaft 17 through the engagement between each of the inner pins 35 and its corresponding inner pin hole 34.

With the above construction, when the rotor shaft 13 is rotated to eccentrically rotate the sun gear 26, the sun gear 26 is rotated at the reduced rotational speed, which is lower than that of the rotor shaft 13. Then, the rotation of the sun gear 26 at the reduced rotational speed is transmitted to the output shaft 17. The output shaft 17 is connected to a control rod 45 (described later), which drives the shift range change mechanism 3 and the parking change mechanism 4.

Alternative to the above described construction of the first embodiment, the inner pin holes 34 may be formed in the sun gear 26, and the inner pins 35 may be provided in the flange 33.

The shift range change mechanism 3 and the parking change mechanism 4 are driven to change its operational position by the output shaft of the rotary actuator 1 (specifically, the output shaft 17 of the speed reducer 6).

In the shift range change mechanism 3, a manual spool valve 42, which is provided in a hydraulic valve body 41, is slid and is thereby changed to a corresponding position, which corresponds to the instructed shift range, so that a hydraulic pressure supply passage, which supplies a hydraulic pressure to each corresponding hydraulic clutch (not shown) of the automatic transmission 2, is changed to control an engaged/disengaged state of the hydraulic clutches.

In the parking change mechanism 4, a park pole 44, which is rotatably supported by a fixing member (e.g., a housing of the automatic transmission 2), is engaged with and disengaged from a parking gear 43, which is rotated synchronously with a drive axle of the vehicle to change the operational state of the parking gear 43 between a locked state (a parking state) and an unlocked state (a parking released state). Specifically, the parking change mechanism 4 is changed between the locked state and the unlocked state through engagement and disengagement between a corresponding recess 43a of the parking gear 43 and a protrusion 44a of the park pole 44. When the rotation of the parking gear 43 is limited, driving wheels of the vehicle are locked through the drive axle and a differential gear. Thereby, the vehicle is placed in the parking state.

A generally fan shaped detent plate 46 is fixed to the control rod 45, which is driven by the rotary actuator 1. The control rod 45 and the detent plate 46 are rotated together.

A plurality of recesses 46a is provided in a radially outer end (a generally fan shaped outer arcuate portion) of the detent plate 46. When an engaging portion 47a at a distal end of a detent spring 47, which is fixed to the hydraulic valve body 41 (or the interior of the automatic transmission 2), is engaged with the corresponding recess 46a, the current shift range is maintained. In the present embodiment, the detent mechanism, which uses the plate spring, is illustrated. Alternatively, any other detent mechanism, which uses, for example, a coil spring, may be used.

A pin 48, which drives the manual spool valve 42, is fixed to the detent plate 46.

The pin 48 is engaged with an annular groove 49, which is formed in an end portion of the manual spool valve 42. When the detent plate 46 is rotated by the control rod 45, the pin 48 is driven along an arcuate path. Thus, the manual spool valve 42, which is engaged with the pin 48, is moved linearly in an interior of the hydraulic valve body 41.

In a view taken in a direction of an arrow A in FIG. 2, when the control rod 45 is rotated in a clockwise direction, the pin 48 is driven in the clockwise direction through the detent plate 46. Thus, the pin 48 pushes the manual spool valve 42 toward the interior of the hydraulic valve body 41 to sequentially change an active hydraulic fluid passage in the hydraulic valve body 41 in an order of a hydraulic fluid passage of a drive range (D-range), a hydraulic fluid passage of a neutral range (N-range), a hydraulic fluid passage of a reverse range (R-range) and a hydraulic fluid passage of a parking range (P-range). Thus, the shift range of the automatic transmission 2 is changed in the order of the D-range, the N-range, the R-range and the P-range.

On the other hand, when the control rod 45 is rotated in the reverse direction, the pin 48 pulls the manual spool valve 42 away from the hydraulic valve body 41 to change the active hydraulic fluid passage in the hydraulic valve body 41 in an order of the hydraulic fluid passage of the P-range, the hydraulic fluid passage of the R-range, the hydraulic fluid passage of the N-range and the hydraulic fluid passage of the D-range. Thus, the shift range of the automatic transmission 2 is changed in the order of the P-range, the R-range, the N-range and the D-range.

A park rod 51 is fixed to the detent plate 46 to drive the park pole 44. A conical portion 52 is provided in a distal end portion of the park rod 51.

The conical portion 52 is interposed between a protruded portion 53 of a housing of the automatic transmission 2 and the park pole 44. In the view taken in the direction of the arrow A in FIG. 2, when the control rod 45 is rotated in the clockwise direction (specifically, from the R-range to the P-range), the park rod 51 is driven through the detent plate 46 in a direction of an arrow B in FIG. 2 to push up the park pole 44. Thus, the park pole 44 is rotated about a shaft 44b in a direction of an arrow C in FIG. 2. Therefore, the protrusion 44a of the park pole 44 is engaged with the opposed recess 43a of the parking gear 43 to achieve the locked state (the parking state) of the parking change mechanism 4.

When the control rod 45 is rotated in the opposite direction (specifically, from the P-range to the R-range), the park rod 51 is pulled back in an opposite direction, which is opposite from the direction of the arrow B in FIG. 2. Thus, the urging force, which pushes up the park pole 44, is removed. The park pole 44 is always urged by a coil spring (not shown) in an opposite direction, which is opposite from the direction of the arrow C in FIG. 2. Thus, the protrusion 44a of the park pole 44 is pushed away from the opposed recess 43a of the parking gear 43 to release the parking gear 43 into a free state, and thereby the parking change mechanism 4 is placed into the unlocked state (the parking released state).

As shown in FIG. 3, the rotary actuator 1 includes an encoder 60, which senses the rotational angle of the rotor 11 and is received in the housing (the front housing 18 and the rear housing 20) of the rotary actuator 1. The rotational angle of the rotor 11 is sensed with the encoder 60, so that the motor 5 can be rotated at a high speed without losing the synchronism of the motor 5.

The encoder 60 is of an incremental type and includes magnets 61 and Hall ICs (e.g., rotational angle sensing Hall ICs, each of which senses a magnetic flux of the corresponding opposed magnetic pole of the magnets 61, and an index signal Hall IC, which senses a magnetic flux that is generated every time one complete cycle of excitation of the phases of the excitation coils 22 completes) 62. The magnets 61 are rotated integrally with the rotor 11. The Hall ICs 62 are arranged in the rear housing 20 such that the Hall ICs 62 are opposed to the magnets 61 to sense the magnetism generated from the magnets 61. The Hall ICs 62 are supported on a circuit board 63, which is fixed in the rear housing 20.

Next, the SBW ECU 7 will be described with reference to FIG. 4.

The SBW ECU 7, which controls the supply of electric power to the motor 5, includes a microcomputer of a known structure having a CPU, a storage device (also referred to as a storage arrangement or a storage means) 70, an input circuit, an output circuit and a power supply circuit. The CPU executes various control processes and computation processes. The storage device 70 stores various programs and data. Based on a result of computations, the SBW ECU 7 supplies a control signal to a coil drive circuit 71 that controls the excitation of the excitation coils 22. The SBW ECU 7 executes duty ratio control of the control signal, which is supplied to the coil drive circuit 71, to control the torque of the motor 5.

In FIG. 4, numeral 72 indicates an ignition switch (IG switch), and numeral 73 indicates a vehicle battery. Furthermore, numeral 74 indicates a display device, which displays the state of the shift range change system (the state of the shift range) to an occupant of the vehicle. In addition, numeral 75 indicates a vehicle speed sensor, and numeral 76 indicates other sensors (e.g., a shift range sensor for sensing the shift range set by the occupant, a brake switch), which sense the state of the vehicle.

The storage device 70, which is provided to the SBW ECU 7, includes a ROM, a RAM and other storage element(s), such as an SRAM. Even after turning off of the electric power source of the SBW ECU 7, weak electric current is kept supplied to the storage element(s), such as the SRAM, to hold the data. For example, when terminals of the battery 73 are disconnected from the vehicle, stored information (e.g., a final range of the automatic transmission described later) will be lost from the storage device 70.

The SBW ECU 7 has various programs, which implement a rotor reading means, a normal control means, an auto-P function, a final range storing means and a P-wall abutment executing means. The rotor reading means obtains a rotational speed, the number of rotations and a rotational angle of the rotor 11 based on the output of the encoder 60. The normal control means controls the motor 5 such that a shift range manipulating means (not shown), which is manipulated by the occupant of the vehicle, and the identified shift range, which is identified by the SBW ECU 7, coincide with each other. The auto-P function places the shift range of the automatic transmission 2 to the P-range and turns off the electric power source of the SBW ECU 7 when the IG switch 72 is turned off. The final range storing means stores the shift range (final range), which is held at the time of turning off of the electric power source of the SBW ECU 7, in the storage device 70 when the IG switch 72 is turned off. Upon satisfaction of a predetermined operational condition, the P-wall abutment executing means rotates the motor 5 to the corresponding rotational position, which corresponds to the P-range, so that the engaging portion 47a of the detent spring 47 (a movable component of the shift range change mechanism 3) abuts against to a parking range wall, i.e., a P-wall 46b of the parking range recess 46a of the detent plate 46 (a parking range side movable limit position) to sense a reference position of the rotor 11.

The normal control means executes the normal control operation. Specifically, the normal control means determines the rotational direction, the number of rotations and the rotational angle of the motor 5 based on the output (instruction) of the shift range manipulating means, which is manipulated by the occupant. Then, based on the determined result, the normal control means controls the power supply to the excitation coils 22 of the multiple phases to control the rotational direction, the number of rotations and the rotational angle of the motor 5. Specifically, at the time of rotating the motor 5, the SBW ECU 7 executes a synchronous operation, in which the power supply state of the excitation coils 22 of the multiple phases is changed based on, for example, the rotational angle of the rotor 11 that is sensed with the encoder 60 to control the rotational direction, the number of rotations and the rotational angle of the motor 5 and thereby to control the change in the shift range change mechanism 3 and the change in the parking change mechanism 4 through the speed reducer 6.

The P-wall abutment executing means executes the P-wall abutment learning when the predetermined operational condition is satisfied (every time when the IG switch 72 is turned on in the present embodiment). The P-wall abutment executing means terminates the P-wall abutment learning when the P-wall abutment learning is executed for a predetermined time period, or when a change in the rotational angle of the rotor 11, which is read from the encoder 60, stops for a predetermined time period, or when the rotor reading means identifies the reference position of the rotor 11.

In generally, the vehicle is designed on the assumption that the vehicle is used in various conditions, so that the vehicle is designed to be parked on a slope (a sloping road).

At the time of parking the vehicle on the slope, the gravitational force, which acts on the vehicle to move the vehicle, is applied, through the axle of the vehicle, to the engaged part between the parking gear 43 and the park pole 44 and between the park pole 44 and the park rod 51 in the parking change mechanism 4. Thus, the motor 5 is provided to generate the force, which can smoothly release the engagement between the parking gear 43 and the park pole 44 at the rotary actuator 1 by pulling the park rod 51 at the time of releasing the parking (time of changing from the P-range to one of the non-parking ranges, which are also abbreviated as the Non-P-ranges) even in the parked state of the vehicle on the slope.

That is, the output torque (first output torque) A of the motor, which is required for the parking release (the P-range to one of the Non-P-ranges), is set to be a relatively large value in view of the parking on the slope.

However, when the P-wall abutment learning is executed in the state where the rotary actuator 1 always exerts the maximum torque, the SBW ECU 7 rotates the rotor 11 to the P-range side rotational limit, and the engaging portion 47a of the detent spring 47 abuts against the limiting wall (the P-wall 46b) of the detent plate 46 to generate the relatively large impact load. Here, it should be noted that the limiting wall of the detent plate 46 does not refer to a rigid actual physical wall. More likely, the limiting wall of the detent plate 46 may refer to an imaginary limiting wall that is supposed to exist at a location where the engaging portion 47a of the detent spring 47 is engaged to the corresponding recess 46a of the detent plate 46 and limits further rotation of the detent plate 46. Furthermore, when the rotation of the motor 5 is locked, an excessive output torque (excessive load) is applied to the rotation transmission system, which is located from the motor 5 to the drive subject (the shift range change mechanism 3 and the parking change mechanism 4).

In view of the above disadvantage, according to the previously proposed technique, at the time of executing the P-wall abutment learning, the electric power is supplied to the excitation coils 22 by executing the duty ratio control to reduce the output torque of the motor 5 and thereby to reduce the mechanical load during the P-wall abutment learning.

Here, the P-wall abutment learning may be started in one of first and second cases (i), (ii). In the first case (i), the P-wall abutment learning is started at the P-range upon turning on of the IG switch 72. In the second case (ii), the P-wall abutment learning is started at one of the Non-P-ranges, which are other than the P-range, upon turning on of the IG switch 72.

The first case (i) occurs at the relatively high frequency.

Specifically, the IG switch 72 is turned off after the range is changed to the P-range by the auto-P function. Thus, at the time of turning on of the IG switch 72, the shift range of the automatic transmission 2 is normally the P-range. Therefore, the P-wall abutment learning is started from the P-range in the most cases.

In contrast, the second case (ii) occurs at the very low frequency.

Now, the embodiment will be described with reference to the case where the IG switch 72 is turned on at one of the Non-P-ranges. At the time of assembling the vehicle at the factory, the range is set to the N-range (one of the Non-P-ranges) to enable the transferring of the vehicle. In such a case, the electric power source of the SBW ECU 7 may be intentionally turned off at the N-range to enable the towing of the vehicle. Thereafter, the IG switch 72 may be turned on from that state. Alternatively, the electric power source of the SBW ECU 7 may be turned off at the Non-P-range due to malfunctioning. Thereafter, the IG switch 72 may be turned on from that state.

Thus, in the case of the P-wall abutment learning of the previously proposed technique, the output torque of the motor 5, which is used at the P-wall abutment learning, is determined in view of the case where the IG switch 72 is turned on at the Non-P-range, which occurs at the very low frequency.

That is, at the time of executing the P-wall abutment learning, the duty ratio control is executed to reduce the output of the motor 5. However, according to the previously proposed technique, the duty ratio is set such that an output torque (second output torque) B, which is required to change from the Non-P-range to the P-range (parking setting), is generated from the motor 5.

According to the previously proposed technique, the torques of the motor 5 are set as follows for the various change control processes.

| (Change State): | (Output Torque) |
|---|---|
| P-range Disengagement: | Output Torque A |
| P-range Engagement: | Output Torque A |
| Non-P-range to Non-P-range Change: | Output Torque A |
| P-wall Abutment: | Output Torque B |

Here, "P-range Disengagement" refers to the parking release, i.e., the change from the P-range to one of the Non-P-ranges. Furthermore, "P-range Engagement" refers to the parking setting, i.e., the change from one of the Non-P-ranges to the P-range. Also, "Non-P-range to Non-P-range Change" refers to the change from one of the Non-P-ranges to another one of the Non-P-ranges in the situation other than the parking release and the parking setting. In addition, "P-wall Abutment" refers to the wall abutment learning.

The output torque (third output torque) C of the motor 5, which is required to change from one of the Non-P-ranges to another one of the Non-P-ranges at the situation other than the parking release and the parking setting, is smaller than the output torques A, B described above.

Furthermore, the output torque (fourth output torque) D of the motor 5, which is required to implement the P-wall abutment learning from the P-range, is smaller than the output torque C.

That is, the output torques, which are required at the motor 5, are set according to the type of the change process to achieve the relationship of the output torque A>the output torque B>the output torque C>the output torque D.

As discussed above, the output torque, which is required at the motor 5 at the time of executing the P-wall abutment learning from the P-range, is the output torque D. However, upon consideration of the P-wall abutment learning from one of the Non-P-ranges, which occurs at the very low frequency, the output torque of the motor 5 at the time of executing the P-wall abutment learning is set to the output torque B through the duty ratio control in the previously proposed technique.

Therefore, in the case of executing the P-wall abutment learning from the P-range, which occurs at the relatively high frequency, the motor 5 may possibly generate an excessively large torque to apply a relatively large mechanical damage to the movable member and the stationary member (e.g., the rotary actuator 1 and the automatic transmission 2) to reduce the durability thereof.

In order to address the above disadvantages, the shift range change system of the first embodiment adapts the following measures.

As discussed above, according to the first embodiment, the output torque of the motor 5, which is required for the parking release (i.e., the change from the P-range to one of the Non-P-ranges), is set to be the output torque A. Furthermore, the output torque of the motor 5, which is required for the parking setting (i.e., the change from one of the Non-P-ranges to the P-range), is set to be the output torque B. The output torque of the motor 5, which is required for changing from one of the Non-P-ranges to another one of the Non-P-ranges in the situation other than the parking release and the parking setting, is set to be the output torque C. Furthermore, the output torque of the motor 5, which is required to implement the P-wall abutment learning from the P-range, is set to be output torque D. These output torques (first to fourth output torques) A-D have the relationship of the output torque A>the output torque B>the output torque C>the output torque D.

The motor 5 is designed such that the output torque A is achieved by supplying the electric power to the excitation coils 22 without executing the duty ratio control.

The output torques B to D are achieved through the duty ratio control of the excitation coils 22.

For example, in one exemplary case, the torques may be set as following. Here, it should be noted that the following torques may possibly be slightly different from the actual values. The output torque A of the motor 5, which is required for the parking release (i.e., the change from the P-range to one of the Non-P-ranges), is set to be about 20 Nm. The output torque of the motor 5, which is required for the parking setting (i.e., the change from one of the Non-P-ranges to the P-range), is set to be about 10 Nm. The output torque of the motor 5, which is required for changing from one of the Non-P-ranges to another one of the Non-P-ranges in the situation other than the parking release and the parking setting, is set to be about 5 Nm. Furthermore, the output torque of the motor 5, which is required to implement the P-wall abutment learning from the P-range, is set to be about 2 Nm.

Here, as discussed above, the SBW ECU 7 has the final range storing means, which stores the shift range (the final range) in the storage device 70 at the time of turning off of the electric power source of the SBW ECU 7 upon the turning off of the IG switch 72.

The SBW ECU 7 of the first embodiment changes the output torque of the motor 5 between the case, in which the final range stored in the storage device 70 at the time of the turning on of the IG switch 72 is the P-range, and the case, in which the final range stored in the storage device 70 at the time of the turning on of the IG switch 72 is the Non-P-range (one of the Non-P-ranges).

Specifically, the SBW ECU 7 controls the output torque of the motor 5 to the output torque C or the output torque D at the time of executing the P-wall abutment learning from the P-range. Furthermore, the SBW ECU 7 controls the output torque of the motor 5 to the output torque A or the output torque B at the time of executing the P-wall abutment learning from the Non-P-range (one of the Non-P-ranges).

Furthermore, in the state where the storage device 70 does not have the final range stored therein upon the turning on of the IG switch 72 (this state will be referred to as a battery cut-off state since this state is the same as the state that is encountered at the time of cutting off the battery to cause the memory loss of the final range in the storage device 70), the SBW ECU 7 of the first embodiment controls the output torque of the motor 5 to the output torque A or the output torque B to enable the execution of the P-wall abutment learning from any of the shift ranges in view of the fact that the current shift range is unknown.

Here, it is conceivable that the rotary actuator 1 is dismounted due to, for example, a maintenance reason. When the dismounted rotary actuator 1 is re-installed to the vehicle, the final range, which is stored in the storage device 70, may not coincide with the actual shift range (the actual shift range may possible be one of the Non-P-ranges).

In view of the above fact, the vehicle has a warning instructing means for instructing clearing, i.e., erasing of the final range (the final range stored at the time of turning off of the electric power source in response to the turning off of the IG switch 72) stored in the storage device 70, more specifically, instructing cutting-off of the battery (temporarily disconnecting the battery terminals) when the rotary actuator 1 is dismounted. A warning instructing means (warning instructing device) 81 may be a written message (e.g., a message written on a paper or a sticker or the like) or a displayed message (e.g., a message displayed on a screen of an electric display device or the like). For example, the warning instructing means 81 may be a written message on an owner's manual, a service manual or the like provided to the vehicle, or may be a written message provided to an easy to see location (e.g., on the automatic transmission 2, the rotary actuator 1, a sun visor or the like), which can be easily noticed by a driver or a service worker who conducts the maintenance work of the rotary actuator 1.

In the case where the rotary actuator 1 is dismounted, when the IG switch 72 is turned on after the cutting off of the battery, the output torque of the motor 5 is controlled to the output torque A or the output torque B.

The torques of the motor 5 according to the first embodiment may be summarized as follows for the various change control processes.

| (Change Control Process): | (Output Torque) |
|---|---|
| P-range Disengagement: | Output Torque A |
| P-range Engagement: | Output Torque A or B (desirably, B) |
| Non-P-range to Non-P-range Change: | Output Torque A-C (desirably, C) |
| P-range to P-wall Abutment: | Output Torque C or D (desirably, D) |
| Non-P-range to P-wall Abutment: | Output Torque A or B (desirably, B) |
| Battery Cut-off to P-wall Abutment: | Output Torque A or B (desirably, B) |

Here, "P-range to P-wall Abutment" refers to the execution of the P-wall abutment learning from the P-range. Furthermore, "Non-P-range to P-wall abutment" refers to the execution of the P-wall abutment learning from one of the Non-P-ranges. Also, "Battery Cut-off to P-wall Abutment" refers to the execution of the P-wall abutment learning from the state where the final range is not stored in the storage device 70.

For example, in a case where the duty ratio 1 (torque: low), which generates the output torque that is required for the execution of "P-range to P-wall Abutment", is set, the torques of the motor 5 may be set as follows for the various change control processes.

| (Change Control Process): | (Control State of Excitation Coils 22) |
|---|---|
| P-range Disengagement: | No Duty Ratio Control (Output Torque A) |
| P-range Engagement: | No Duty Ratio Control (Output Torque A) |
| Non-P-range to Non-P-range Change: | No Duty Ratio Control (Output Torque A) |
| P-range to P-wall Abutment: | Control at Duty Ratio 1 (Output Torque D) |
| Non-P-range to P-wall Abutment: | No Duty Ratio Control (Output Torque A) |
| Battery Cut-off to P-wall Abutment: | No Duty Ratio Control (Output Torque A) |

Figure 1:
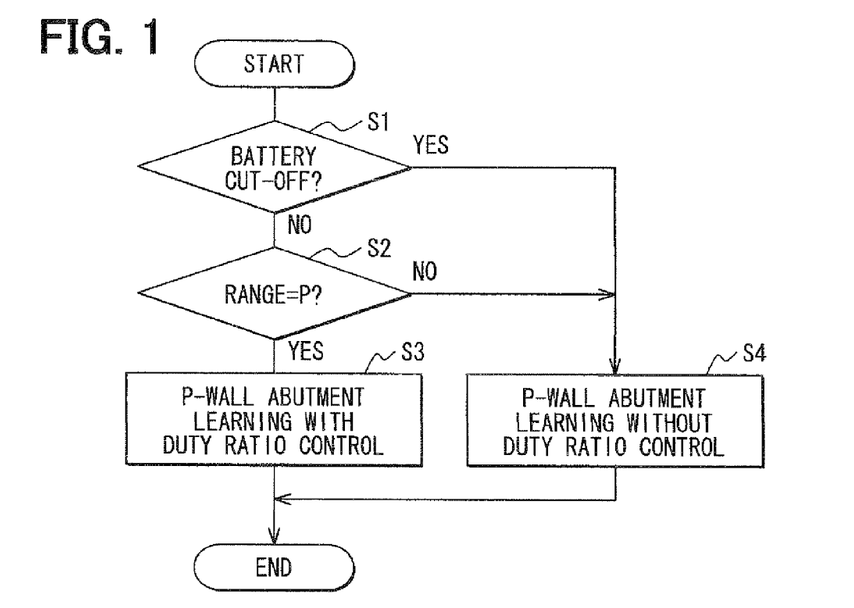
FIG. 1 is a flowchart showing a torque control operation of an electric motor at time of P-wall abutment learning according to an embodiment of the present invention.

Next, the control operation of the SBW ECU 7 in the case of executing the P-wall abutment learning upon turning on of the IG switch 72 will be described with reference to a flowchart of FIG. 1.

When the IG switch 72 is turned on (START), it is determined whether the current state is the battery cut-off state at step S1.

When NO is returned at step S1, control proceeds to step S2. At step S2, it is determined whether the final range, which is stored in the storage device 70, is the P-range.

When YES is returned at step S2, control proceeds to step S3. At step S3, the excitation coils 22 are energized at the duty ratio 1 to control the output torque of the motor 5 to the output torque D and thereby to execute the P-wall abutment. Then, the present routine is terminated.

When YES is returned at step S1, control proceeds to step S4. Also, when NO is returned at step S2, control proceeds to step S4. At step S4, the electric power supply to the excitation coils 22 is controlled with no duty ratio control, so that the output torque of the motor 5 is controlled to the output torque A to execute the P-wall abutment learning. Then, the present routine is terminated.

According to the first embodiment, in the case where the P-wall abutment learning is executed from the P-range (this case occurring at the relatively high frequency), it is possible to limit the occurrence of the generation of the excessively high output torque from the motor 5. Therefore, it is possible to avoid or minimize the mechanical damages to the components (e.g., the speed reducer 6, the engaging portion 47*a* of the detent spring 47) of the rotation transmission system and/or the mechanical damages to the engaging portion(s) between the movable member(s) and the stationary member(s). That is, it is possible to limit the mechanical damages in the case of executing the P-wall abutment learning from the P-range (the case occurring at the relative high frequency).

Furthermore, it is possible to limit the power consumption of the motor 5 in the case of executing the P-wall abutment learning from the P-range (the case occurring at the relatively high frequency), and thereby it is possible to limit the power consumption of the shift range change system.

Also, it is possible to reduce the heat generation from the excitation coils 22 in the case of executing the P-wall abutment learning from the P-range (the case occurring at the relatively high frequency). Thereby, it is possible to take the countermeasures against the heat generation of the excitation coils 22 in the simple manner.

Second Embodiment

A second embodiment of the present invention will now be descried. In the following description, components, which are similar to those of the first embodiment, will be indicated by the same reference numerals.

In the first embodiment, the electric power supply to the excitation coils 22 is controlled with use of the duty ratio control only in the case of executing "P-range to P-wall Abutment".

In contrast, according to the second embodiment, the electric power supply to the excitation coils 22 is controlled with use of the duty ratio control in all of the change control processes except the process of P-range Disengagement.

Specifically, the duty ratio 1 (torque: low), which generates the output torque D that is required for P-range to P-wall Abutment, is the same as that of the first embodiment. Furthermore, according to the second embodiment, the duty ratio 2 (torque: high), which generates the output torque B that is required for "P-range Engagement", is also set. The torques of the motor 5 may be set as follows for the various change control processes.

| (Change Control Process): | (Control State of Excitation Coils 22) |
|---|---|
| P-range Disengagement: | No Duty Ratio Control (Output Torque A) |
| P-range Engagement: | Control at Duty Ratio 2 (Output Torque B) |
| Non-P-range to Non-P-range Change: | Control at Duty Ratio 2 (Output Torque B) |
| P-range to P-wall Abutment: | Control at Duty Ratio 1 (Output Torque D) |
| Non-P-range to P-wall Abutment: | Control at Duty Ratio 2 (Output Torque B) |
| Battery Cut-off to P-wall Abutment: | Control at Duty Ratio 2 (Output Torque B) |

According to the second embodiment, it is possible to limit generation of the excessive output torque from the motor 5 in the change control processes of "P-range Engagement", "Non-P-range to Non-P-range Change", "Non-P-range to P-wall Abutment", and "Battery Cut-off to P-wall Abutment". Therefore, it is possible to avoid the mechanical damages to the components (e.g., the speed reducer 6, the engaging portion 47*a* of the detent spring 47) of the rotation transmission system and/or the mechanical damages to the engaging portion(s) between the movable member(s) and the stationary member(s). Furthermore, it is possible to limit the power consumption of the motor 5, and thereby it is possible to limit the power consumption of the shift range change system.

The above embodiment may be modified as follows.

In the above embodiments, the SR motor is illustrated as the example of the motor 5. Alternatively, the motor 5 may be any other suitable motor, such as another reluctance motor (e.g., a synchronous reluctance motor), a permanent magnet motor (e.g., a surface permanent magnet (SPM) motor, an interior permanent magnet (IPM) motor).

In the above embodiments, the encoder 60 is illustrated as the specific example. However, the encoder 60 may be eliminated, and the number of times of power supply (energization) of the respective excitation coils 22 may be counted to control the number of rotations and the rotational angle of the rotor 11.

In the above embodiments, the inner gearing planetary gear speed reducer (the cycloid speed reducer) is illustrated as the example of the speed reducer 6. Alternatively, the speed reducer 6 may be another type of planetary gear speed reducer, which includes the sun gear 26 driven by the rotor shaft 13, a plurality of planetary pinions arranged one after another at equal intervals about the sun gear 26, and a ring gear meshed with the planetary pinions.

Additional advantages and modifications will readily occur to those skilled in the art. The invention in its broader terms is therefore not limited to the specific details, representative apparatus, and illustrative examples shown and described.

What is claimed is:

1. A shift range change system for a vehicle, comprising:
    a shift range change mechanism that changes a shift range of an automatic transmission of the vehicle among a plurality of ranges, which includes a parking range and a plurality of non-parking ranges;
    a parking change mechanism that limits rotation of a drive axle of the vehicle upon placing of the shift range into the parking range and enables the rotation of the drive axle upon releasing of the shift range from the parking range;
    an electric rotary actuator that includes an electric motor and drives the shift range change mechanism and the parking change mechanism; and
    a motor control apparatus that adjusts an output torque of the electric motor through duty ratio control and includes:
        a normal control means for controlling the change of the shift range by controlling the electric power supplied to the electric motor; and
        a parking range wall abutment executing means for executing parking range wall abutment learning to sense a reference position of a rotor of the electric motor by rotating the electric motor in a predetermined direction upon satisfaction of a predetermined operational condition and thereby driving a movable member of the shift range change mechanism toward a parking range side movable limit position until the movable member abuts against the parking range side movable limit position, wherein:
    the electric motor is required to provide at least a first output torque at the time of releasing the shift range from the parking range;
    the electric motor is required to provide at least a second output torque, which is smaller than the first output torque, at the time of placing the shift range into the parking range;
    the electric motor is required to provide at least a third output torque, which is smaller than the second output torque, at time of changing the shift range from one of the plurality of non-parking ranges to another one of the plurality of non-parking ranges;
    the electric motor is required to provide at least a fourth output torque, which is smaller than the third output torque, at time of executing the parking range wall abutment learning;
    when the parking range wall abutment learning is executed from the parking range, the motor control apparatus controls the output torque of the electric motor to the third output torque or the fourth output torque; and
    when the parking range wall abutment learning is executed from any one of the plurality of non-parking ranges, the motor control apparatus controls the output torque of the electric motor to the first output torque or the second output torque.

2. The shift range change system according to claim 1, wherein:
    the motor control apparatus includes a storage means for storing a current shift range when an ignition switch of the vehicle is turned off to turn off an electric power source;
    when the motor control apparatus determines that the current shift range, which is stored in the storage means, is the parking range at time of turning on of the ignition switch, the motor control apparatus controls the output torque of the electric motor to the third output torque or the fourth output torque and executes the parking range wall abutment learning; and
    when the motor control apparatus determines that the current shift range, which is stored in the storage means, is one of the plurality of non-parking ranges at the time of turning on of the ignition switch, the motor control apparatus controls the output torque of the electric motor to the first output torque or the second output torque and executes the parking range wall abutment learning.

3. The shift range change system according to claim 2, wherein when the motor control apparatus executes the parking range wall abutment learning from a state where the storage means stores no shift range, the motor control apparatus determines that the parking range wall abutment learning is executed from one of the plurality of non-parking ranges and thereby controls the output torque of the electric motor to the first output torque or the second output torque.

4. The shift range change system according to claim 3, further comprising a warning instructing means for providing an instruction to erase the stored shift range from the storage means when the rotary actuator is dismounted.

* * * * *